United States Patent [19]
Winkler et al.

[11] Patent Number: 4,866,834
[45] Date of Patent: Sep. 19, 1989

[54] METHOD FOR PRODUCING MOUNTING AND VALVE BORES IN A WHEEL

[75] Inventors: Hans-Henning Winkler, Tuttlingen; Eugen Rütschle, Mühlheim, both of Fed. Rep. of Germany

[73] Assignee: Chiron-Werke GmbH & Co. KG, Tuttlingen, Fed. Rep. of Germany

[21] Appl. No.: 255,901

[22] Filed: Oct. 11, 1988

[30] Foreign Application Priority Data

Oct. 23, 1987 [DE] Fed. Rep. of Germany ....... 3735859
Oct. 23, 1987 [DE] Fed. Rep. of Germany ....... 3735858

[51] Int. Cl.⁴ ..................... B23Q 3/157; B23C 9/00; B23B 35/00
[52] U.S. Cl. ................................. 29/568; 29/159.1; 408/1 R; 409/131
[58] Field of Search ............ 29/568, 558, 559, 159.01, 29/159.1, 159 R; 408/1, 44, 69; 409/131, 132, 224; 157/14, 20; 269/61, 74, 57

[56] References Cited

U.S. PATENT DOCUMENTS

| 3,602,094 | 8/1971 | Bardiau | 409/224 |
|---|---|---|---|
| 3,822,959 | 7/1974 | Tabard | 409/132 |
| 3,998,127 | 12/1976 | Romeu | 29/559 |
| 4,304,034 | 12/1981 | Trevarrow | 29/159.01 |
| 4,353,156 | 10/1982 | Rosaz | 29/221.5 |
| 4,369,958 | 1/1983 | Maynard | 269/61 |
| 4,490,079 | 12/1984 | Trevarrow | 408/1 R |
| 4,529,342 | 7/1985 | Babel | 409/224 |
| 4,575,288 | 3/1986 | Roschiwal et al. | 408/1 R |
| 4,656,726 | 4/1987 | Suzuki et al. | 29/568 |
| 4,664,570 | 5/1987 | Tsukiji | 409/132 X |
| 4,701,081 | 10/1987 | Hashimoto et al. | 408/1 R |
| 4,704,773 | 11/1987 | Quinart et al. | 29/27 C |

FOREIGN PATENT DOCUMENTS

| 2302631 | 1/1973 | Fed. Rep. of Germany. |
| 2756706 | 12/1977 | Fed. Rep. of Germany. |
| 2853488 | 12/1978 | Fed. Rep. of Germany. |
| 3333499 | 9/1983 | Fed. Rep. of Germany. |
| 3624284 | 7/1986 | Fed. Rep. of Germany. |
| 2242193 | 3/1975 | France | 409/224 |
| 404350 | 6/1966 | Switzerland | 29/558 |
| 1077750 | 3/1984 | U.S.S.R. | 409/224 |

OTHER PUBLICATIONS

Rainer Löll, "Lkw-Radnaben Bearbeiten-Handhaben-Messen-Korrigieren" vol. 75, 1981, Number 8/81, Journal tz für Metallbearbeitung.

Klaus Benzinger, Andreas Kirchheim and Zdravko Paluncic, "Bearbeitungszentren", vol. 128, 1986, Number 17, Sep., Journal VDI-Zeitschrift.

Primary Examiner—William Briggs
Attorney, Agent, or Firm—Rosenblum, Parish & Bacigalupi

[57] ABSTRACT

A methode serves for producing bores in wheels of motor vehichles, in particular for producing mounting bores (14) in a wheel disk (12) or valve bores in a rim of the wheels. The bore has a larger diameter ($D_1$, $D_3$) in the area of the surfaces (135, 136) of the wheel disk than in the area between these surfaces.

In order to enable a countersunk portion to be produced in the area of the bore also in the surface opposite the machining surface, with the wheel in a signle mounting position, a tool (160) is employed whose bottom face exhibits a hook-like configuration (162, 163, 164, 165) and which can be passed through the bore in vertical direction (170), in axially displaced relation. Thereafter, the tool (160) is returned to a position in which it is aligned with the axis (15) of the bore, then rotated and retracted. whereby a countersunk portion (144) of larger diameter is produced. Finally, the tool can be removed from the bore by carrying out the described steps in the reverse order.

1 Claim, 7 Drawing Sheets

METHOD FOR PRODUCING MOUNTING AND VALVE BORES IN A WHEEL

The present invention relates to a method for producing bores in wheels of motor vehicles, comprising the steps of producing mounting bores, which extend in parallel to the axis of the wheel, in a wheel disk and valve bores, which extend at an angle relative to the axis of the wheel, in the rim of a wheel, the bores being produced between a first and a second surface of one area of the wheel and the diameters of the bores being larger in the plane of the surfaces than in the portions between the surfaces, the method using a machine tool comprising a spindle which is adapted for chucking tools and which can be displaced relative to the wheel along the tool axis and also perpendicularly thereto.

According to a known method, the wheel is mounted on the work table, whereafter one produces first the through-hole and then the countersunk portion on the one surface of the wheel. In order to enable the other countersunk portion to be produced on the opposite surface of the wheel, the mounting position of the wheel is then changed, for example turned by 180°.

This makes the known method very labor-intensive because for the purpose of producing the bores the mounting position of the wheel has to be changed by a total of 180°, which requires either very complex mounting mechanisms or a considerable labor input.

Now, it is the object of the present invention to improve a method of the described type in such a manner that the wheel can be provided with countersunk portions of larger diameter in the area of the described bores and on both surfaces, without the necessity to change the mounting position of the wheel.

This object is achieved according to the invention by the steps of (a) mounting a wheel in a holding fixture of a work table in such a manner that its first surface faces the tools, its second surface faces away from the tools and the axis of the wheel occupies a first angular position relative to the axis of the tool;

(b) producing a first through-hole with the smallest diameter of the bore;

(c) producing a countersunk portion of larger diameter in the first surface of the first through-hole;

(d) leaving the mounting position of the wheel unchanged, while displacing a tool whose bottom is provided with an axial shank arranged eccentrically relative to the tool axis and provided with a radial projection which is in turn provided with a cutting edge on its side facing the spindle, the radial clear width of the shank, including the projection and the cutting edge, being smaller than the diameter of the through-hole, to move the tool radially into a first position in which the axis of the tool is offset relative to a longitudinal axis of the through-hole in such a manner that the shank, including the projection and the cutting edge, are located axially inside the periphery of the through-hole;

(e) advancing the tool axially through the through-hole into a second position in which the cutting edge is located at the other side of the second surface opposite the spindle;

(f) displacing the tool radially into a third position in which the tool axis coincides with the longitudinal axis of the through-hole;

(g) retracting and rotating the tool for producing the second countersunk portion of larger diameter;

(h) returning the tool in the radial direction to its second position;

(i) returning the tool axially into its first position (k) pivoting the hooding fixture by the said angle, about an axis extending perpendicularly to the axis of the wheel;

(l) producing a second through-hole with the smallest diameter of the bore;

(m) producing a countersunk portion of larger diameter in the first surface of the second through-hole;

(n) leaving the mounting position of the wheel unchanged, while displacing a tool whose bottom is provided with an axial shank arranged eccentrically relative to the tool axis and provided with a radial projection which is in turn provided with a cutting edge on its side facing the spindle, the radial clear width of the shank, including the projection and the cutting edge, being smaller than the diameter of the through-hole, to move the tool radially into a fourth position in which the axis of the tool is offset relative to a longitudinal axis of the through-hole in such a manner that the shank, including the projection and the cutting edge, are located axially inside the periphery of the thorugh-hole;

(o) advancing the tool axially through the through-hole into a fifth position in which the cutting edge is located at the other side of the second surface opposite the spindle;

(p) displacing the tool radially into a sixth position in which the tool axis coincides with the longitudinal axis of the through-hole;

(q) retracting and rotating the tool for producing the second countersunk portion of larger diameter;

(r) returning the tool in the radial direction to its fifth position;

(s) returning the tool axially into its fourth position.

This solves the object underlying the present invention fully and perfectly because it is now possible to produce a mounting bore or valve bore with countersunk portions arranged on both sides, without changing the mounting position of the wheel, it being an additional decisive advantage of this method that an extremely simple tool is required only and that the spindle of the machine tool has to perform only very simple movements.

Altogether, one therefore achieves the advantage that the bores which necessarily have to be produced in production motor vehicle wheels can be produced with simple devices, simple tools, and with the wheel in a single mounting position.

Other advantages of the invention will appear from the following description and the attached drawing.

It is understood that the features which have been described above and will be explained further below may be used not only in the described combinations, but also in any other combination or individually, without leaving the scope and intent of the present invention.

One embodiment of the invention will now be described in more detail with reference to the drawing in which.

Figure 1:
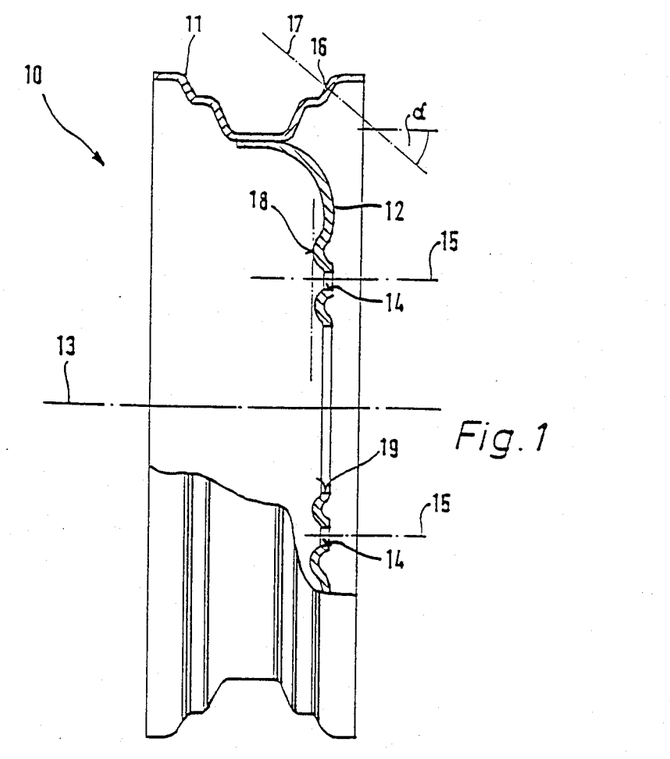
FIG. 1 shows a side view, partly broken away, of a wheel with its rim and wheel disk, and the necessary bores.

Referring now to FIG. 1, reference numeral 10 designates generally a wheel of a motor vehicle which, for the sake of clarity, is shown without tires. The wheel 10 consists in the usual manner of a rim 11 and a wheel disk 12 arranged about a first axis 13 of the wheel 10. The wheel disk 12 is provided with a plurality of, for example four or five, mounting bores 14 distributed over its periphery. The second axes 15 of the mounting bores 14 extend in parallel to the first axis 13 of the wheel 10.

The rim 11 is provided with a valve bore 16 arranged in the neighborhood of its outer periphery. The third axis 17 of the said valve bore 16 extends at an angle relative to the first axis 13 of the wheel 10.

The mounting bores 14 serve for screwing the wheel 10 - in a reference plane 18—to an axle flange of the motor vehicle by means of suitable screws or other mounting means. The axle flange is passed through a central opening 19 in the wheel disk 12. The valve bore 16 serves for accommodating the valve of a tire not shown in FIG. 1.

It goes without saying that the bores 14 and 15 mentioned before are described here by way of example only and that the invention extends of course also to other bores, for example centering bores or balancing bores intended for compensating a given imbalance of the wheel 10.

Figure 2:
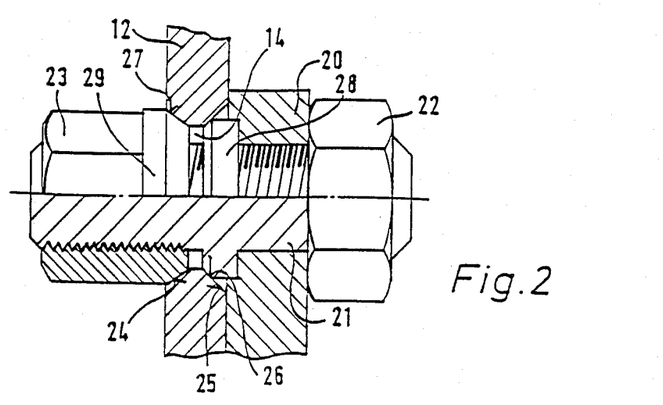
FIG. 2 illustrates, in enlarged scale, the manner in which a wheel is mounted on a motor vehicle according to the state of the art.

FIG. 2 shows an embodiment of the invention where the wheels 10 are fixed in a conventional manner to an axle flange 20 of the motor vehicle. Screwed connections of the illustrated type have been known before, for example from German Industrial Standard DIN 74 361.

The axle flange 20 is passed by a threaded bolt 21 which is fastened by a check nut 22 at the rear of the axle flange 20. A wheel nut 23 fitted on the other end of the threaded bolt 21 serves for fastening the wheel disk 12 of the wheel 10 on the axle flange 20.

The wheel disk 12 is provided with a first centering cone 24 in the area of the mounting bore 14, and with a second centering cone 25 at its front or rear side. The cones 24, 25 coact with a first counter-cone 26 and a second countercone 27 arranged at a shoulder 18 of the threaded bolt 21 and the rear face of the wheel nut 23, respectively.

The described arrangement ensures that the wheel 19 is automatically centered during the mounting operation on the axle flange 20.

It should be noted that the mounting arrangement illustrated in FIG. 2 has been described only by way of example and does not form part of the present invention. The only essential thing, for the purposes of the present invention, is seen in the fact that the mounting bores 14, just as the valve bores 16, of the wheels 10 end in any case at their front and rear in enlarged portions adjacent the respective surfaces of the wheel disk 12, while the central portions of the described bores 14, 16 exhibit a smaller diameter.

In order to achieve such a configuration of the bores, the invention proposes a method which will be described hereafter with refernces to the motion diagrams shown in FIGS. 3 to 6:

A wheel to be machined is mounted on a work table 134, which will be described in more detail further below with reference to FIGS. 7 to 11. With respect to the described example, FIGS. 3 to 6 illustrate initially the case where a mounting bore 14 is to be produced in the wheel disk 12 of the wheel 10.

Figures 3, 4:
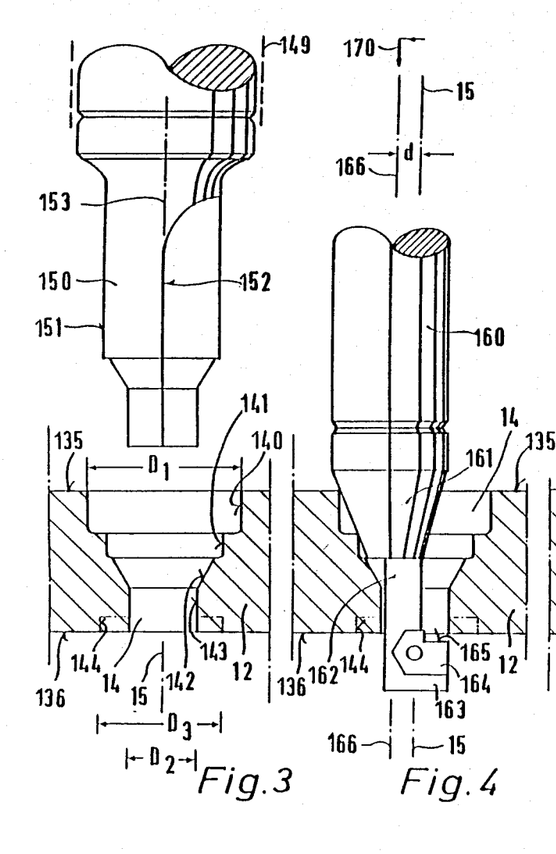
FIGS. 3–6 show different motion diagrams illustrating one embodiment of the method according to the invention.

The illustrated area of the wheel disk 12 comprises a first upper surface 35 and a second lower surface 136, and the wheel 10 is mounted in such a manner that the second surface 136 is arranged at a certain spacing above the surface of the work table 134.

In FIG. 3, one can see a mounting bore 14 in the condition in which a first, cylindrical portion of a larger diameter $D_1$ has been machined into the material, followed - from the surface 135 in downward direction - by a second, likewise cylindrical portion 141 of smaller diameter and thereafter by a third portion 142 tapering still further and, finally, by a fourth likewise cylindrical portion 143 of a smaller diameter $D_2$.

This can be achieved, for example, by means of a machine tool 149 with a tool 151 chucked in the spindle, whose contour 151 comprises a cutting edge 152 which may be adapted, for example, to the outer contour of the portions 141 to 143 in order to machine the latter by a single operation.

A fourth axis 153 of the tool 150 extends in this case coaxially with the second axis 15 of the mounting bore 14.

Figure 5:
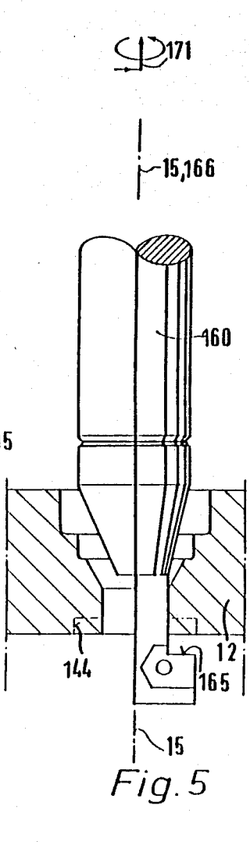

Now, the mounting bore 14 is to be provided with a fifth portion, namely a cylindrical countersunk portion of a larger diameter $D_3$, adjacent its second surface 136, as shown in dash-dotted lines in FIGS. 3 to 5.

This is obviously not possible with the aid of a tool of the type of the tool 150 illustrated in FIG. 3, because the through-hole of the mounting bore 14, as shown in FIG. 3, has a minimum diameter equalling the diameter $D_2$ of the fourth portion 143 so that the area of the fifth portion 144 with the larger diameter $D_3$ is not readily accessible.

Figure 6:
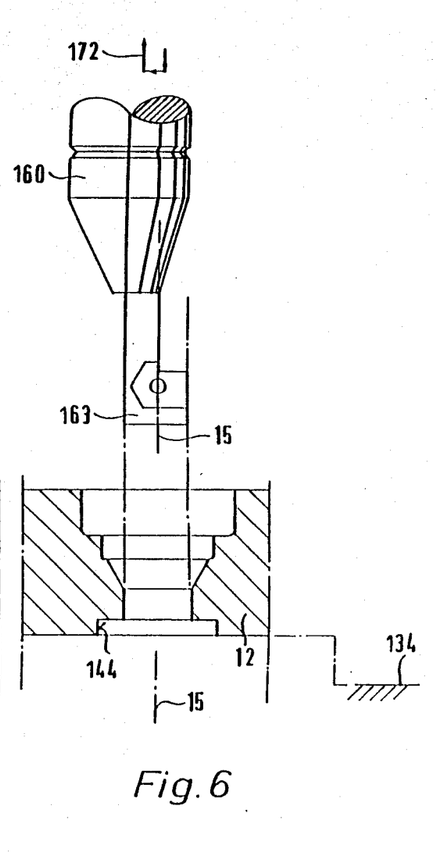

The method of the invention now uses a hook-like counterbore 160 as illustrated in FIGS. 4 to 6. The counterbore 160 according to the invention ends at its bottom in a conical portion 161 which in turn forms the transition to an eccentric shank 162. The lower end of the eccentric shank 162 is provided with a radially extending projection 163 carrying a cutting plate 164. The cutting plate 164 is provided with a cutting edge 165 which may, for example, face the conical portion 161 of the counterbore 160, although this arrangement is to be understood only as an example as the cutting edge 165 may of course have any other shape, too.

It is one important aspect of the counterbore 160 that the radial width of the shank 162, including the projection 163 and the cutting plate 164, must be smaller than the diameter $D_2$ of the fourth portion 143, i.e. smaller than the clear width of the mounting bore 14 in its condition as throughhole according to FIG. 3.

The spindle of the machine tool 149 is designed in the conventional manner so that the tools can be displaced not only along their longitudinal axis, but also in a horizontal direction extending perpendicularly thereto.

The method according to the invention makes use of this fact insofar as the tool 160 is initially displaced in the direction indicated by arrow 170 in FIG. 4 until its fifth axis 166 is spaced by a distance d from the second axis 15 of the mounting bore 14. In this position, the outer contour of the shank 162, together with the projection 163 and the cutting plate 164, is located inside the clear width of the fourth portion 143 of the mounting bore 14. The tool 160 can now be displaced downwardly, in the vertical direction, until the shank 162, together with the projection 163 and the cutting plate 164, project from below the second surface 136. The cutting edge 165 is now also located below the second surface 136.

The counterbore 160 is now retracted in the horizontal direction—as indicated by arrows 171 in FIG. 5—until the fifth axis 166 of the counterbore 160 is again in alignment with the second axis 15 of the mounting bore 14. In this position, the counterbore is raised and simultaneously rotated to cause the cutting edge 165 to machine the fifth portion 144 into the second surface 136, in the form of a cylindrical countersunk portion.

Once this operation has been completed, the counterbore 160 is initially lowered a little—as indicated by arrows 172 in FIG. 6—and then retracted radially until the eccentric position illustrated in FIG. 4 is reached, in which the axes 15 and 66 are disposed at a spacing d relative to each other, whereafter the counterbore is retracted vertically to the top and clear of the mounting bore 14. This completes the machining operation for the cylindrical countersunk portion 144 at the lower face of the wheel disk 12.

It will easily be appreciated that it has been possible in this way to produce the cylindrical countersunk portion, i.e. the fifth portion 144 located at the rear of the tool, with a relatively simple tool and a likewise relatively simple motion sequence of the spindle, without the need to change the mounting position of the wheel 10.

From FIGS. 3 to 6 it appears that it is possible in this manner to produce fifth portions 144 of different diameters of the rear of the tool, the limits of this possibility being set by the fact that the diameter $D_3$ of the fifth portion 142 may not be larger than twice the value of the smallest diameter $D_2$ of the mounting bore 14.

It has been mentioned before that the practical configuration of the mounting bore 14, including the portions 140 to 142, illustrated in FIGS. 3 to 6 is of course to be understood only as an example and is not means to limit in any way the scope of the invention.

The mounted wheel 10 is now turned by the angle $\alpha$ about an axis extending perpendicularly to the axis 13 of the wheel 10. This operation leads to the condition that the third axis 17 of the valve bore 16 now extends in parallel to the fourth axis 153 of the tool 150.

The machining operations described above are now repeated—if necessary using a tool of slightly different dimensions—for producing countersunk portions also on both sides of the valve bore 16.

The essential advantage of the invention is seen in the fact that the whole machining operations required for the mounting bores 14 and the valve bores 16 can be carried out with the wheel remaining in a single mounting position, as the mounting bores 14 are finished first, whereafter the valve bore 16 is produced without having to change the mounting position of the wheel 10. It is of course understood that the described operations may also be carried out in the reverse order.

For the purpose of pivoting the mounted wheel 10 between the two machining operations, the method according to the invention uses a device of a type which will now be described in more detail.

Figure 7:
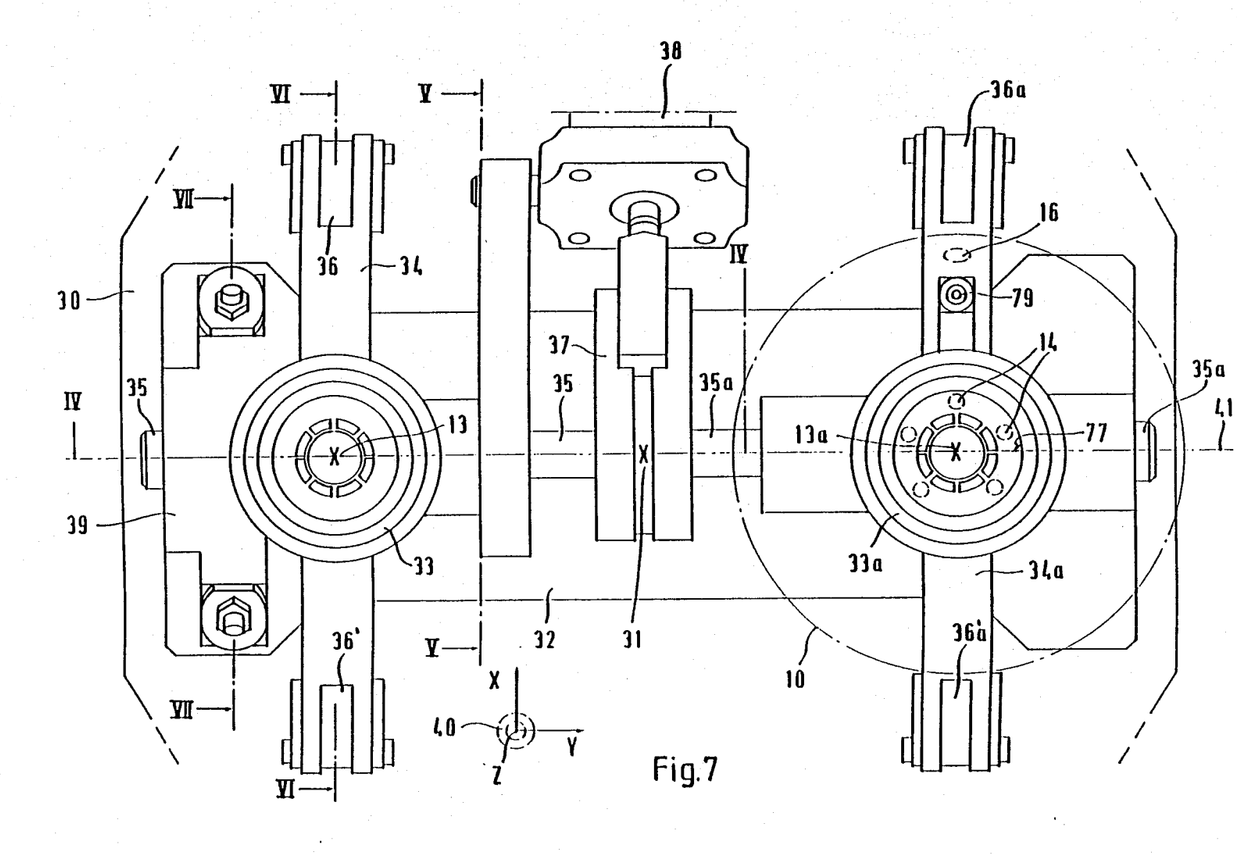
FIG. 7 shows a top view of one embodiment of a device according to the invention, with holding fixtures for wheels provided in tandem arrangement.

FIG. 7 shows a top view of a work table 30 of a machining center which is arranged for being pivoted about a horizontal axis 31, and this preferably in opposite directions by 180° each.

A work table 30 carries a base plate 32 on which two holding fixtures 33, 33a for the wheels 10 are mounted in symmetrical arrangement relative to the vertical axis 31. The holding fixtures 33 and 33a are arranged on tilting tables 34, 34a. The tilting tables 34, 34a are fixed against relative rotating on shafts 35, 35a which extend coaxially to each other and with their end faces arranged adjacent each other. The free ends of the tilting tables 34, 34a carry holding-down devices 36, 36' and 36a, 36a', respectively.

A crank 37 is connected against relative rotation with the shafts 35, 35a and is actuated by a first piston-and-cylinder unit 38.

The left free end of the shaft 35 carries a stop 36 which acts to limit the tilting movement of the tiling tables 34 and 34a.

A machining center, of which the work table 30 is a part, is indicated at 40. The tool 40 can be displaced along three Cartesian coordinates, with the x and y axes arranged in the drawing plane of FIG. 7, while the z axis extends perpendicularly thereto.

In one typical embodiment of the invention, the work table 30 is arranged in a horizontal plane and can be rotated about a vertical axis 31. Accordingly, the x and y axes extend in the horizontal plane, while z symbolizes a vertical spindle axis.

The longitudinal axis of the shafts 35 and 35a is indicated in FIG. 7 by reference numeral 41.

Figure 8:
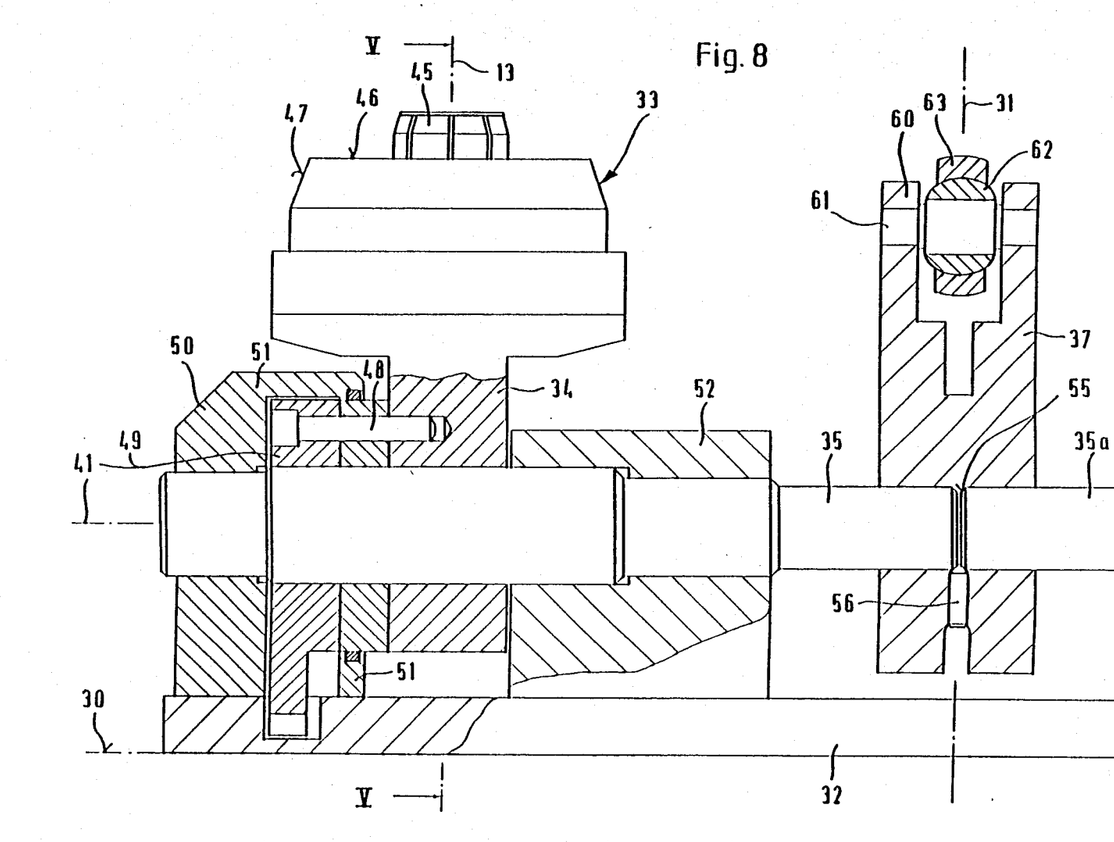
FIG. 8 shows a cross-section through part of the device shown in FIG. 7, along line VIII—VIII in FIG. 7, in enlarged scale.

FIG. 8 shows a partial sectional view taken along line VIII—VIII in FIG. 7 and, accordingly, a side view of the holding fixture 33.

The holding fixture 33 is provided with an expansion member 45 which projects axially from a radial reference surface 46, in the direction of the first axis 13 of the wheel 10. The reference surface 46 is followed by a downwardly opening conical portion 47. The dimensions of the reference surface 46, of the conical portion 47 and of the other components of the holding fixture 33 are adapted to the inner space of the wheel disk 12 of the wheel 10 being processed at any time.

The tilting table 34 is rigidly connected, by means of an axially extending screw 48, with a stop element 49 arranged to rotate in a first bearing bush 50. The bearing bush 50 constitutes simultaneously an enclosure 51 so that the stop element 49 is fully enclosed and embedded in the lubricant of the shaft 35.

The central area of the shaft 35 is rotatably seated in a second bearing bush 52, the bearing bushes 50 and 52 being arranged on both sides of the tilting table 34.

It can be seen in the right half of the illustration of Fig. 8 that the shafts 35, 35a extend along the same fourth axis 41 and have their end faces arranged immediately adjacent each other. The end faces are provided with chamfers 55, and the tip of an expansion pin 56 or an expansion screw is arranged in a manner to ensure that the shafts 35 and 35a are kept at a certain spacing relative to each other when being adjusted in the axial direction. This enables the positions of the holding fixtures 33 and 33a to be precisely adjusted relative to the vertical axis 31 so that the holding fixtures 33 and 33a will always occupy identical positions in the working area of the spindle of the machining center when the work tables 30 are tilted by 180° in either direction.

It can be further seen in the right half of FIG. 8 that the end portion of the crank 37 is formed by a fork-shaped free end 60 carrying a bolt 61 extending in parallel to the fourth axis 41. The bolt 61 is passed through a lug 62 provided on the free end of the piston rod 63.

Figure 9:
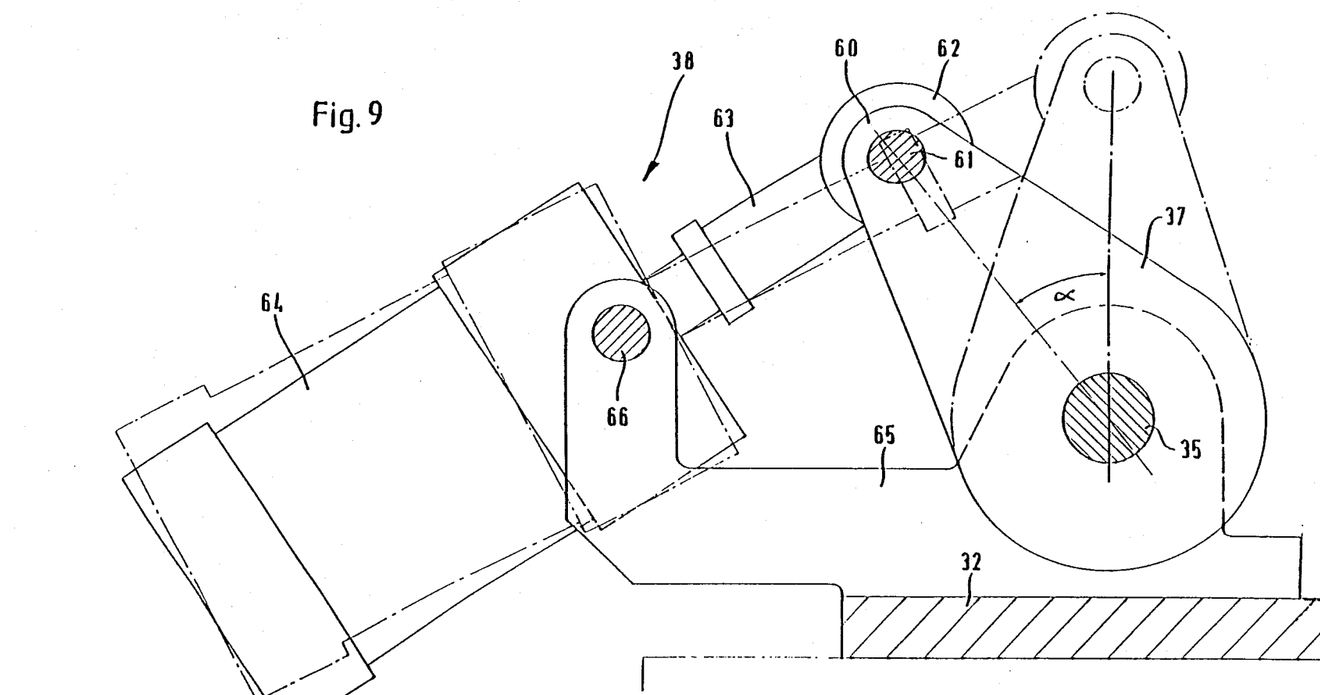
FIG. 9 shows a view of the device according to FIG. 7, in the direction of arrows IX—IX in FIG. 7, likewise in enlarged scale.

In FIG. 9 it can be seen in addition that the piston 63 is part of the first piston-can-cylinder unit 38. The cylinder 64 of the first piston-and-cylinder unit 38 is pivoted on mounting means 65, by means of a bolt 66, and the axes of the bolts 61 and 66 extend in parallel to the fourth axis 41 of the shaft 35.

The mounting means 65 in turn is connected to the base plate 32 in fixed relationship.

Figure 10:
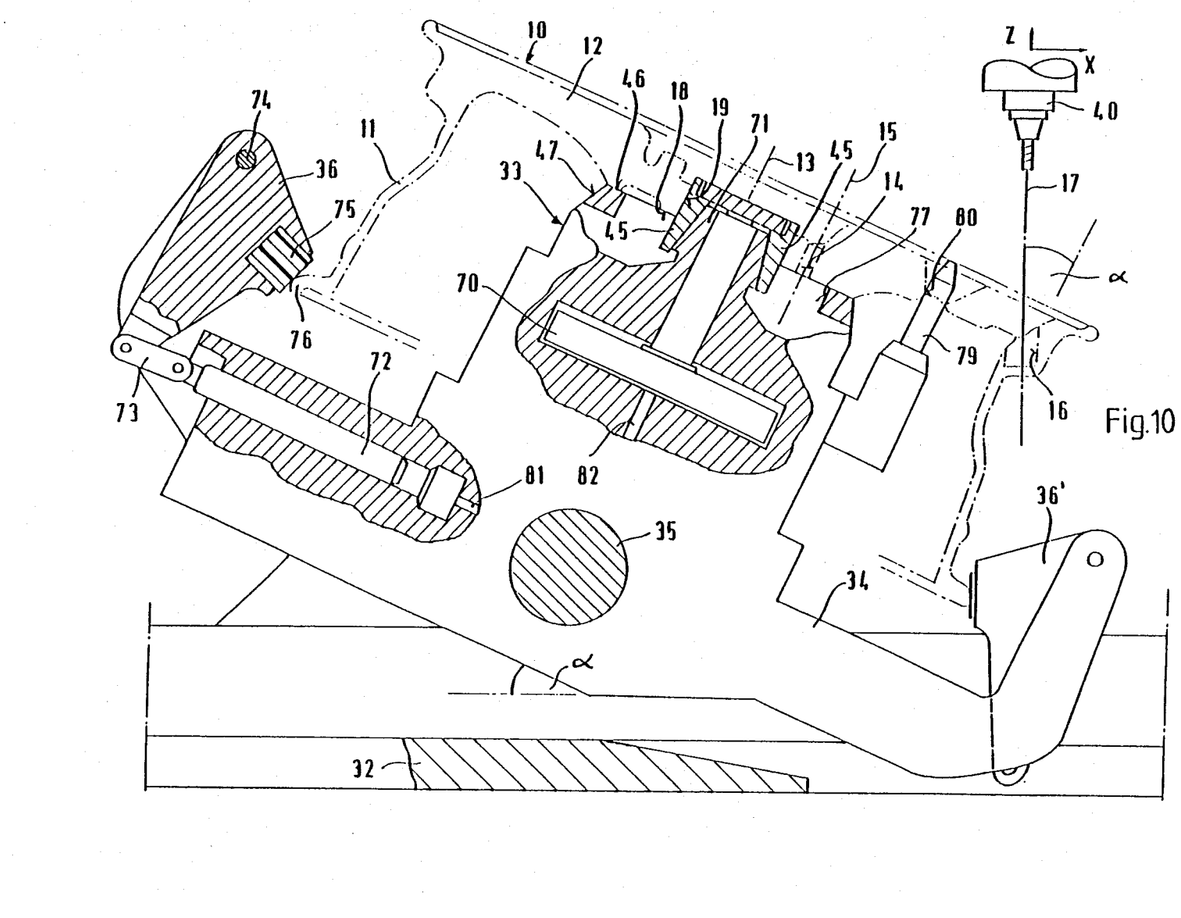
FIG. 10 shows another section through the device according to FIG. 7, along line X—X in FIG. 7, likewise in enlarged scale.

FIG. 10 shows additional details of the manner in which a wheel 10 is mounted on the holding fixture 33.

The holding fixture 33 comprises a second integrated piston-and-cylinder unit 70 whose sense of movement along the first axis 13 coincides with the center axis of the wheel 10. The free end of the second piston-and-cylinder unit 70 actuates an expansion cone 71 which, in the nonactivated condition, passes through the central opening 19 of a wheel 10, which is positioned loosely on the holding fixture 33, either in form-locking engagement or with a certain play. When the second piston-and-cylinder unit 70 is operated, the expansion cone 71 will spread radially outwardly and is, thus, in a position to center the wheel 10 radially and axially, and to hold the wheel in the radial direction.

The tilting table 34 further comprises two third integrated piston-and-cylinder units 72 arranged in diametrical direction. One of these units 72 can be seen in FIG. 10. The third piston-and-cylinder unit 72 is provided on its free active end with a linkage 73 engaging the lower end of the holding-down device 36. The holding-down device 36 is arranged to pivot about a bolt 73 extending in parallel to the shaft 35.

Preferably, the holding-down device 36 is equipped with a contact element 75, for example a plastic part, by which the holding-down device 36 engages a rim flange 76 of the wheel 10 from the inside, or in the representation of FIG. 10 from above, when thereference plane 18 of the rim flange 76 has been positioned on the reference surface 46 of the holding fixture 33.

The holding fixture 33 is further provided, at a defined point of its periphery, with a radially projecting holder for an axial centering arbor 79 which engages a coacting defined opening 80 in the wheel disk 12 when the wheel 10 has been positioned correctly on the holding fixture 33.

A fluid, for example compresssed air or a hydraulic fluid, can be admitted to the piston-and-cylinder units 70,72 via fluid lines 81, 82. The fluid lines 81, 82 can be interconnected for common operation of the piston-and-cylinder units 70 and 72, and may be connected to a common supply and switching arrangement.

Figure 11:
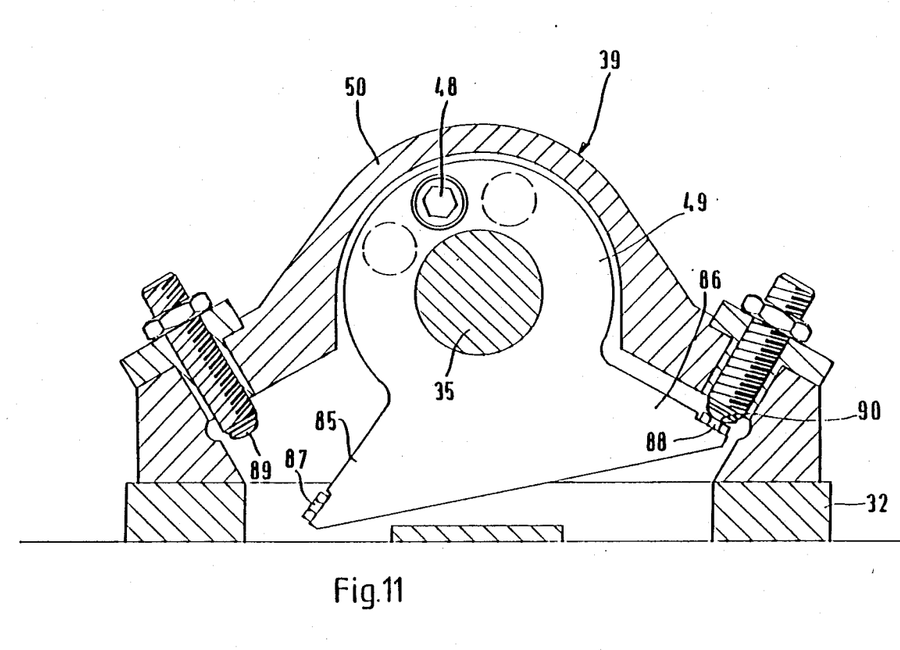
FIG. 11 shows another section through the device according to FIG. 7, along line XI—XI in FIG. 7, likewise in enlarged scale.

FIG. 11 finally shows certain details fo the stop mechanism 39.

The stop element 49 ends at its bottom in two legs 85, 86 the free ends of which are provided with stop screws 87,88.

The first bearing bush 50 is likewise provided with stop screws 89 and 90, in the area of its transition to the base plate 32, so that a limited pivoting angle can be adjusted for the stop element 49 by corresponding adjustment of the stop screws 87 to 90. In the embodiment illustrated in fig. 7, this pivoting angle corresponds to an angle of, for example, 15°.

The mechanism illustrated in FIGS. 7 to 11 operates as follows:

The numerical control of the machine tool causes the work table 30, which carries all the components described before, to be tilted for example into the position illustrated in FIG. 7 in which the holding fixture 33a is located in the working area of the spindle—whereby a so-called machining side of the work table 30 is defined—while the holding fixture 33 is then located on the so-called mounting side of the table, readily accessible for the user of the machining center.

In this position, the wheel 10 mounted on the holding fixture 33a is machined by the tool of the machining center indicated at 40. During this operation, one produces at first the five mounting bores 14, for example, which usually take the form of stepped bores with countersunk portions provided on both sides. During the production of the mounting bores 14, the holding fixture 33a and the tilting table 34a occupy a position in which the reference surface 46 extends parallel to the surface of the work table 30, and accordingly, perpendicularly to the z axis of the tool 40.

Upon completion of all five mounting bores 14 and, if necessary, of any coaxially extending additional bores, the fitst piston-and-cylinder unit 38 is actuated, and the piston rod 63 is retracted into the cylinder 64. This causes the crank 37 to move in counterclockwise direction—as viewed in FIG. 9—from its position indicated in dash-dotted lines to its position shown in full lines. The holding fixture 33 is thereby moved into the pivoted position illustrated in FIG. 10, in which the third axis 17 of the valve 16 extends in parallel to the z axis of the tool 40. By displacing the spindle appropriately, the tool 40 can now be brought into a machining position in which the tools are aligned with the valve bore 16 so that the valve bore 16 can now be produced in the described manner.

Once the valve bore 16, which extends at a certain angle relative to the center axis 13 of the wheel, has been finished, the piston-and-cylinder unit 38 is actuated once more to return the holding fixture 33 into its horizontally aligned initial position and to rotate the work table 30 about its vertical axis 31 by 180°.

Now, the second and third piston-and-cylinder units 70, 72 are actuated to lift the holding-down devices 36 and 36′ off the rim flange 76 and to retract the expansion cone 72 in the radial direction so that the finished wheel 10 can be lifted off the holding fixture 33 in the axial direction.

The user of the machine tool may now mount the next wheel 10 on the free holding fixture 33. Due to the presence of the centering arbor 69, this can be done, however, only with the wheel 10 in one defined angular position in which the centering arbor 79 fits exactly into the matching opening 80 oin the wheel disk 12 of the wheel 10.

When the wheel 10 is mounted on the holding fixture 33, its reference surface 18 comes into contact with the reference surface 46. By operation of a control and switching device not shown in the drawing, a pressure fluid is then again admitted through the fluid lines 81, 82 so that the contact elements 75 of the holding-down devices 36 and 36' engage the rim flange 76 from above. The expansion cone 71 is then expanded simultaneously, or with a slight delay, to retain the central opening 19 of the wheel 10 in form-locking and friction-locking engagement.

We claim:

1. A method for machining wheel bolt bores and valve bores into a rim of a motor vehicle wheel, said wheel bolt bores extending in a direction parallel to a wheel axis and said valve bores extending in a direction inclinded by an angle relative to said wheel axis, said bores being machined between a first and a second surface of an area of said rim, a first diameter of said bores in a plane of said surfaces being larger than a second diameter of portion sof said bores between said surfaces, said method using a machine tool with a tool exchanger and a spindle, adapted for exchanging and holding tools, said spindle being displaceable relative to said rim along an axis of said tools, and, also, perpendicularly thereto, the method comprising the steps of:

(a) mounting a rim in chuckiung means on a work table with said first surface facing said spindle and said second surface facing away from said spindle and said wheel axis occupying a first angular position relative to said tool axis;

(b) machining a first through-hole withsaid second diameter, being the smallest diameter of a first bore;

(c) machining a first countersunk portion of said first through-hole into said first surface, said countersunk portion having a larger diameter than said second diameter;

(d) leaving the chucking positin of said rim unchanged, while displacing a first took, said first tool having a bottom being provided with an axial shank arranged eccentrically relative to said tool aixs and being provided with a radial projection, said projection being, in turn, provided with a cutting edge on a side facing said spindle, a radial clear width of said shank, including said projection and said cutting edge, being smaller than said second diameter of said through-hole, displacing said first tool radially into a first position in which said tool axis is offset relative to a longitudinal through-hole axis such that said shank, including said projection and said cutting edge, are arranged inside a radial contour of said first through-hole;

(e) advancing said first tool axially through said first through-hole into a second position in which said cutting edge is located beyond said second surface facing away from said spindle;

(f) displacing said first tool radially into a third position in which said tool axis is aligned with said longitudinal through-hole axis;

(g) axially retracting and rotating said first tool for machining a second countersunk portion of said first through-hole into said second surface, said second countersunk portion having a diameter larger thank said second diameter;

(h) radially returning said first tool into said second position;

(i) axially returning said first tool into said first position;

(k) pivoting said chucking means by said angle about a pivot axis extending perpendicularly to said wheel axis;

(l) machining a second through-hole with another second diameter, being the smallest diameter of a second bore;

(m) machining a first countersunk portion of said second through-hole into said first surface, said countersunk portion having a larger diameter than said another second diameter;

(n) leaving the chucking position of said rim unchanged, while displacing a second tool, said second tool having a bottom being provided with an axial shank arranged eccentrically relative to said tool axis and being provided with a radial projection, said projection being, in turn, provided witha cutting edge on a side facing said spindle, a radial clear width of said shank, including said projection and said cutting edge, being smaller than said another second diameter of said through-hole, displacing said second tool radially into a fourth position in which said tool axis is offset relative to a longitudinal through-hole axis such that said shank, including said projection and said cutting edge, are arranged inside a radial contour of said second through-hole;

(o) advancing said second tool axially through said second through-hole into a fifth position in which said cutting edge is located beyond said second surface facing away from said spindle;

(p) displacing said second tool radially into a sixth position in which said tool axis is aligned with said longitudinal through-hole axis;

(q) axially retracting and rotating said second tool for machining a second countersunk portion of said second through-hole into said second surface, said second countersunk portion having a diameter larger than said another second diameter;

(r) radially returning said second tool into said fifth position;

(s) axially returning said second tool into said fourth position.

* * * * *